United States Patent [19]
Pruett et al.

[11] Patent Number: 6,009,216
[45] Date of Patent: Dec. 28, 1999

[54] COILED TUBING SENSOR SYSTEM FOR DELIVERY OF DISTRIBUTED MULTIPLEXED SENSORS

[75] Inventors: Phillip Edmund Pruett, Bakersfield, Calif.; Arthur D. Hay, Cheshire; Guy A. Daigle, Plainville, both of Conn.

[73] Assignee: CiDRA Corporation, Wallingford, Conn.

[21] Appl. No.: 08/964,818

[22] Filed: Nov. 5, 1997

[51] Int. Cl.[6] .................................................. G02B 6/00
[52] U.S. Cl. .................. 385/12; 73/649; 250/227.11; 219/502
[58] Field of Search .................. 385/12, 13; 73/655, 73/649; 250/227.14, 227.11; 219/502

[56] References Cited

U.S. PATENT DOCUMENTS

| 5,017,761 | 5/1991 | Brunner .................................... 219/502 |
| 5,485,745 | 1/1996 | Rademaker et al. ....................... 73/151 |
| 5,537,364 | 7/1996 | Howlett ..................................... 367/57 |
| 5,542,472 | 8/1996 | Pringle et al. ........................... 166/65.1 |
| 5,638,904 | 6/1997 | Misselbrook et al. .................. 166/384 |
| 5,669,457 | 9/1997 | Sebastian et al. ......................... 175/73 |
| 5,671,811 | 9/1997 | Head ......................................... 166/346 |
| 5,675,674 | 10/1997 | Weis ........................................ 385/12 |
| 5,804,713 | 9/1998 | Kluth .................................... 73/152.01 |
| 5,925,879 | 7/1999 | Hay ..................................... 250/227.14 |

FOREIGN PATENT DOCUMENTS

| 2178185 | 2/1987 | United Kingdom ............. G02B 6/44 |

*Primary Examiner*—Rodney Bovernick
*Assistant Examiner*—Ellen E. Kang

[57] ABSTRACT

Lengths of coiled tubing have sensor carrier elements mounted therebetween such that a plurality of sensor carrier elements are positioned along a length of coiled tubing. Each sensor carrier element carriers a sensor implemented with one or more intrinsic fiber optic sensor elements positioned therein for measuring one or more parameters in an environment. The intrinsic fiber optic sensor elements are multiplexed on one or more optical fibers along the length of the coiled tubing thereby forming a length of coiled tubing having a plurality of spaced apart sensors. The optical fiber or fibers positioned along the length of the coiled tubing are positioned in a fiber carrier which protects the fiber or fibers from the harsh environment. The fiber carrier may be interconnected to each of the sensors to isolate the fibers from the harsh environment. Each sensor carrier element provides the desired transmission of environmental conditions to the sensor carried therein, such as fluid communication, heat transmission, acoustic signal transmission, etc., such that the sensor contained in the sensor carrier element is responsive to a parameter of interest. A plurality of sensors may be serially connected to one another for distributed sensing of one or more parameters at multiple locations along the length of the coiled tubing. The sensor carrier elements are interconnected to the coiled tubing to provide a reliable and secure seal therebetween. The sensor carrier elements are configured to maintain the structural integrity of the coiled tubing while at the same time carrying a sensor implemented with an intrinsic fiber optic sensor element. The sensor carrier elements may be interconnected to the coiled tubing by press fit engagement, welding, fusion, and/or any other suitable method for providing a secure connection between the coiled tubing and the sensor carrier elements.

35 Claims, 5 Drawing Sheets

COILED TUBING SENSOR SYSTEM FOR DELIVERY OF DISTRIBUTED MULTIPLEXED SENSORS

TECHNICAL FIELD

The present invention relates to distributed sensors, and more particularly, to a system for the delivery of distributed multiplex sensors.

BACKGROUND OF INVENTION

In the extraction of oil from earth boreholes, the oil may be extracted from a single location or "zone" within the well, or oil may be extracted from multiple zones within the well. To aid the well operator in maximizing the depletion of the oil within the earth formation, it is desirable to know a variety of information, such as temperature, static pressure, dynamic and acoustic pressure, flow rate, resistivity, etc., about the fluid being produced from each zone within the well.

Coiled tubing is known to be useful for a variety of oil field exploration, testing and/or production related operations. Metal coiled tubing is utilized in oil and/or gas wells by being reeled into and out of a production tubing string.

One use of coiled tubing is for production logging. For example, coiled tubing is used to deliver various sensors for making measurements of the production fluid within the well, e.g., pressure, temperature, resistivity, etc. Sensors are positioned at the end of the coiled tubing, and then the coiled tubing is driven into the well to position the sensor at a desired depth within the well. Alternatively, various types of well tools and sensors are delivered down the coiled tubing after it is positioned within the well. The measurements made using various sensors are performed as single point measurements corresponding to the position of the end of the coiled tubing. The sensor location may be varied by repositioning the coiled tubing for making measurements at multiple locations within a well. While single point measurements provide the well operator with valuable production information, information that is much more valuable could be obtained with simultaneous measurement of multiple parameters at multiple locations within a well, preferably while the well is flowing.

Electrical sensors currently used in oil wells are limited for several reasons. The on-board electronics of such sensors must operate in a very hostile environment, which includes high temperature, high vibration and high levels of external hydrostatic pressure. However, electronics, with its inherent complexity, are prone to many different modes of failure. Such failures have traditionally caused a less than acceptable level of reliability. Additionally, electrical transmissions are subject to electrical noises in some production operations.

Therefore, a reliable method is needed for accurately measuring parameters of a harsh environment, such as a borehole. Additionally, a method and system is needed for measuring multiple parameters at multiple locations within the harsh environment.

SUMMARY OF THE INVENTION

An object of the present invention is to provide an improved system for delivery of distributed multiplex sensors in an extremely harsh environment.

A further object of the invention is to provide such a system that is particularly useful for use within a wellbore of an oil and/or gas well.

A still further object of the present invention is to provide such a system that is used with sensors that are implemented utilizing multiplexed intrinsic fiber optic elements.

According to the present invention, lengths of coiled tubing have sensor carrier elements mounted therebetween such that a plurality of sensor carrier elements are positioned along a length of coiled tubing, each sensor carrier element having a sensor positioned therein for measuring one or more parameters in an environment, and wherein the sensors are distributed along the length of the coiled tubing thereby forming a length of coiled tubing having a plurality of spaced apart sensors.

According further to the present invention, the sensors are implemented with one or more intrinsic fiber optic sensor elements positioned therein for measuring one or more parameters in an environment, and the intrinsic fiber optic sensor elements are multiplexed on one or more optical fibers along the length of the coiled tubing. Alternatively, the sensors may be implemented as electronic sensors, such as an electronic point sensor or multiplexed electronic sensors interconnected to an electrical signal line.

In further accord with the present invention, the optical fiber or fibers positioned along the length of the coiled tubing may be provided in a fiber carrier. The fiber carrier is intended to protect the fiber or fibers from the harsh environment. The fiber carrier may be interconnected to each of the sensors to isolate the fibers from the harsh environment. Additionally, electrical signal line may be received in the fiber carrier.

In still further accord with the present invention, the fiber carrier may include a capillary tube made of a high strength, corrosion resistant material, such as inconel or stainless steel, which is highly resistant to corrosion, pressure, and temperature effects of a high-pressure, high-temperature and corrosive environment. Alternatively, the fiber carrier may include various combinations of materials, such as composite materials, polymers, braiding, armoring, coatings etc., having the optical fibers disposed therein.

According further to the present invention, each sensor carrier element provides the desired transmission of environmental conditions to the sensor carried therein, such as fluid communication, heat transmission, acoustic signal transmission, etc., such that the sensor contained in the sensor carrier element is responsive to a parameter of interest.

In still further accord with the invention, each intrinsic fiber optic sensor element may include a Bragg grating sensor element, such as a Bragg grating point sensor, a resonant cavity formed with multiple Bragg gratings, or a lasing element formed with multiple Bragg gratings. Each Bragg grating sensor element is configured in a desired transduction configuration such that the measurand of interest causes a strain in the Bragg grating sensor element, the magnitude of the strain being related to the measurand of interest. More particularly, each Bragg grating sensor element is responsive to an optical signal and to a strain induced by the transduction structure, the strain being associated with a respective measurand, for providing an optical sensing signal related to a magnitude of the measurand at the sensor location.

According further to the invention, a plurality of sensors may be serially connected to one another for distributed sensing of one or more parameters at multiple locations along the length of the coiled tubing. The serially connected sensors may employ time division multiplexing (TDM) and/or wavelength division multiplexing (WDM) techniques to differentiate between signals from the different serially connected sensors.

According further to the invention, the sensor carrier elements are interconnected to the coiled tubing to provide a reliable and secure seal therebetween. The sensor carrier elements are configured to maintain the structural integrity of the coiled tubing while at the same time carrying a sensor implemented with an intrinsic fiber optic sensor element. The sensor carrier elements may be interconnected to the coiled tubing by press fit engagement, welding, fusion, and/or any other suitable method for providing a secure connection between the coiled tubing and the sensor carrier elements.

In further accord with the present invention, the sensor carrier elements include a fluid bypass channel for providing a fluid communication path between two lengths of coiled tubing interconnected by a sensor carrier element.

The development of intrinsic fiber optic sensors which utilize strain-sensitive intracore Bragg gratings offers the possibility of constructing very small, rugged, and reliable sensors. Such sensors can be made very small in size, which allows several to fit within a confined space. Their intrinsic sensing capability, which requires no failure-prone downhole electronics, also provides an extremely high level of reliability that far surpasses conventional electrical sensors. An additional advantage of Bragg gratings is that the sensed information is wavelength encoded, which makes them relatively insensitive to variations in the light intensity caused by light source degradation over time, and losses in connectors, etc. Wavelength encoding also enables several sensors to be easily multiplexed along the same optical fiber, using for example the techniques of wavelength division multiplexing (WDM) and/or time division multiplexing (TDM). Such sensors are suitable for use in very hostile and remote environments, such as found in earth boreholes from which oil or gas is being extracted.

The present invention provides the significant advantage of a delivery method and apparatus, in the form of coiled tubing, for delivering a plurality of distributed multiplex sensors into the environment of interest. Coiled tubing has long been used in the petroleum industry for well logging of oil and gas wells. Well known tubing delivery equipment is available to install and withdraw coiled tubing from the production string of and oil and/or gas well. The present invention takes advantage of this technology to deliver distributed multiplexed sensors within an oil and/or gas well.

The foregoing and other objects, features and advantages of the present invention will become more apparent in light of the following detailed description of exemplary embodiments thereof, as illustrated in the accompanying drawings.

DETAILED DESCRIPTION OF THE INVENTION

The present invention utilizes coiled tubing for the delivery of sensors, such as fiber optic sensors and/or electrical sensors, into an environment of interest, such as an oil and/or gas well. As used herein, the term "coiled tubing" is intended to refer to tubing used in the petroleum industry that is typically manufactured from strips of low alloy mild steel with a precision cut, and rolled and seam welded in a range of OD (outside diameter) sizes, typically in diameters up to 3 to 6 inches. Improved manufacturing techniques, an increase in wall thickness, and the development of higher strength alloys allow the use of coiled tubing at increasingly higher pressure limits. Additionally, the introduction of new materials and structures, such as titanium and composite material tubing designs, are also expected to further expand coiled tubing's scope of work.

As is known in the art, coiled tubing is provided on a reel. Special tools are provided to retrieve the tubing off the reel and drive it into a well. In accordance with the present invention, a plurality of sensor are distributed along the length of the coiled tubing. The sensors include intrinsic fiber optic sensor elements, and are interconnected to one another by one or more optical fibers. As described in greater detail below, the intrinsic fiber optic sensors are multiplexed with one another, using time division multiplexing (TDM) and/or wavelength division multiplexing (WDM), such that measurements may be made by all of the sensors, essentially at the same time.

Figure 1:
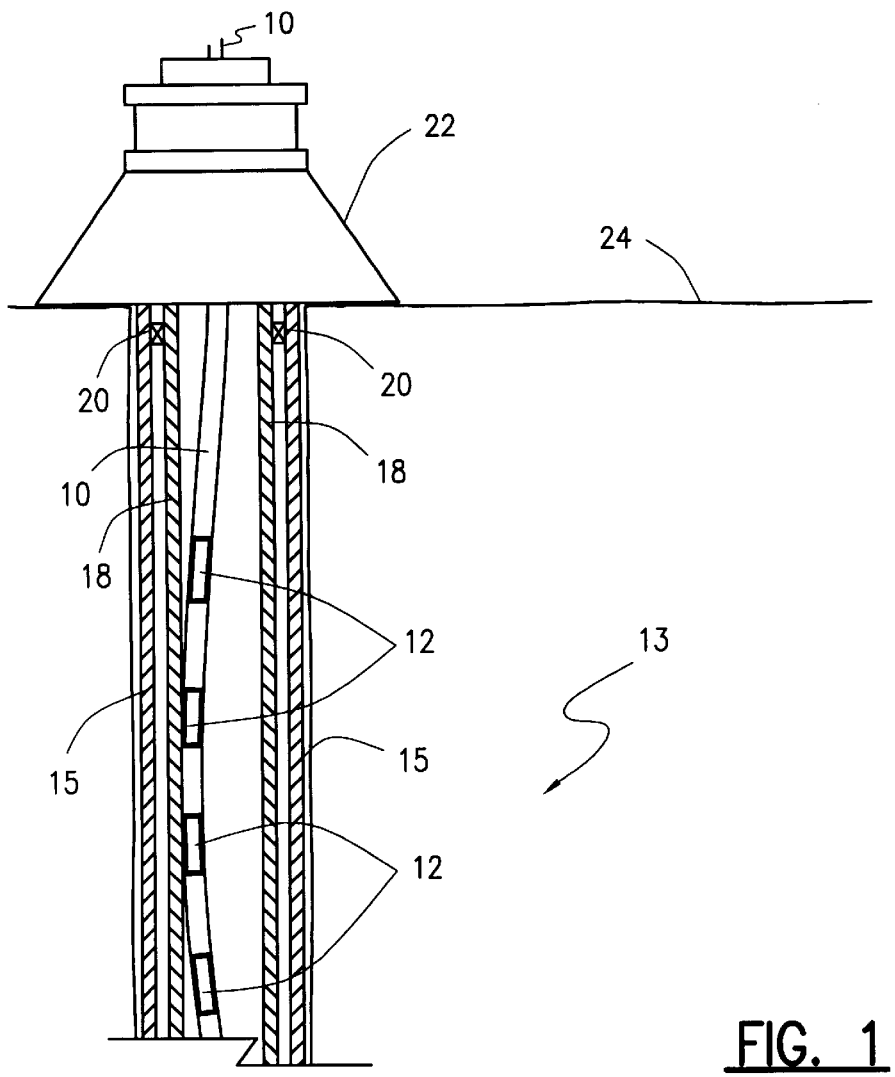
FIG. 1 is a longitudinal cross-sectional view of a wellbore having a coiled tubing with a plurality of distributed multiplexed fiber optic sensors in accordance with the present invention.
Figure 1:
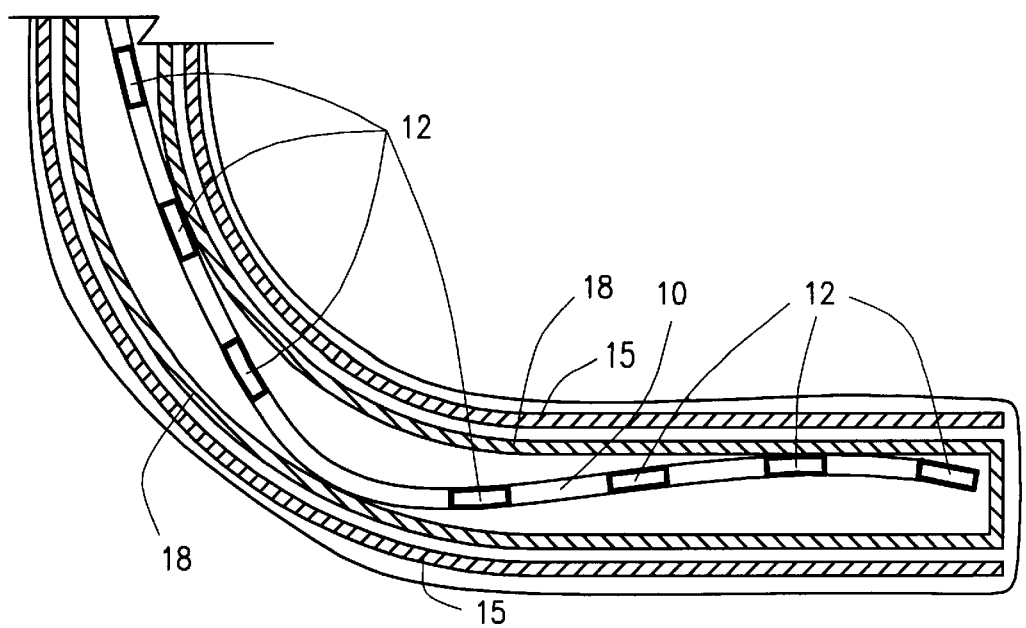

Referring to FIG. 1, the coiled tubing 10 includes a plurality of sensor carrier elements 12, each of which has a sensor implemented with an intrinsic fiber optic sensor element disposed therein. The sensors are used to measure various measurands within the environment of an oil and/or gas well 13. Within the wellbore 14 of the oil and/or gas well 13 are casing strings 15, production tubing 18, and production packers 20. The coiled tubing 10 passes through the well head 22 and the optical fiber or fibers contained therein are interconnected via appropriate optical fibers, couplers, connectors, etc., to optical signal processing equipment (not shown), which is located above the surface 24 of the wellbore 14.

Sensors formed using intrinsic fiber optic elements, such as Bragg grating elements, are particularly useful as strain sensors. When configured in an appropriate transduction configuration, such sensors may be used to sense/measure a variety of environmental conditions, such as pressure (static, dynamic, acoustic), temperature, fluid flow, resistivity, etc. Such sensors may be serially multiplexed for distributed sensing using wavelength division multiplexing (WDM) and/or time division multiplexing (TDM) techniques.

Figure 2:
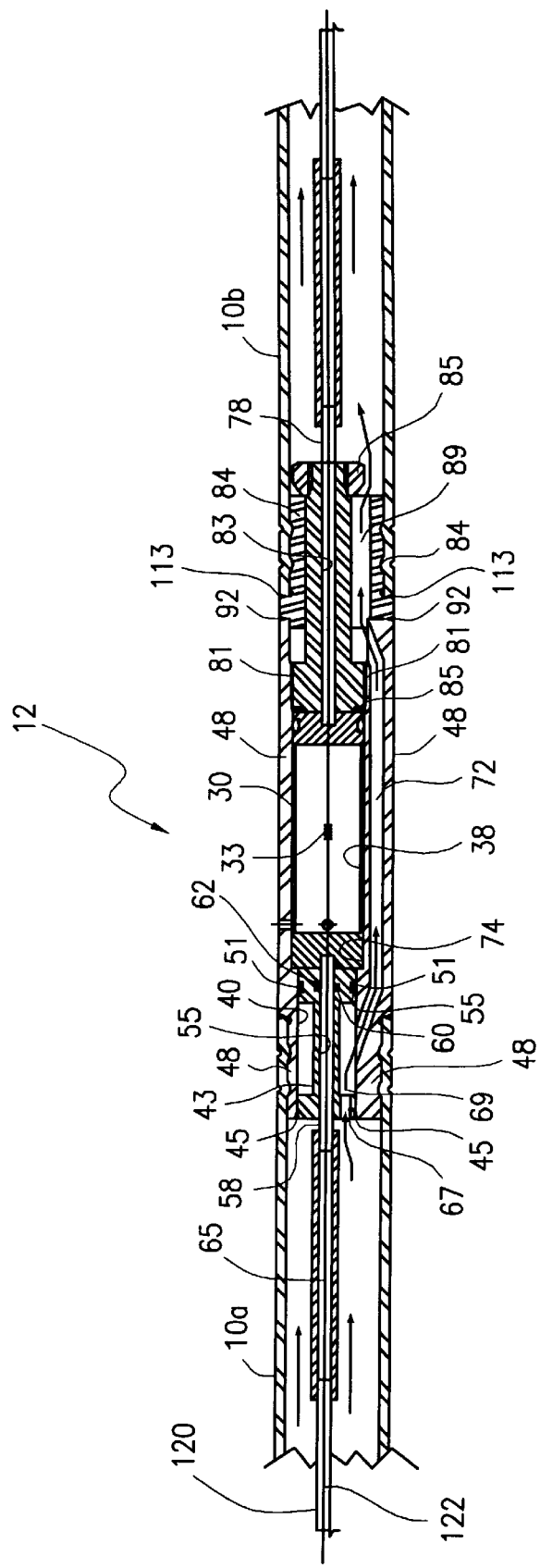
FIG. 2 is a more detailed schematic block diagram of a sensor carrier element for carrying a sensor implemented with an intrinsic fiber optic sensor element used in the coiled tubing of FIG. 1.

Referring now to FIG. 2, the sensor carrier element 12 of the invention is shown connected between two lengths of coiled tubing 10a, 10b. The sensor carrier element 12 is designed to carry a sensor 30 formed using an intrinsic fiber optic sensor element 33, such as a Bragg grating sensor element. For purposes of describing the sensor carrier element 12 of the present invention, a generic sensor 30 will be described wherein the sensor includes a generally cylindrical housing 38. The housing 38 and intrinsic fiber optic sensor element 33 are configured in a suitable transduction configuration such that the sensor element 33 is responsive to the environment to measure a parameter of interest. For example, the fiber optic sensor element 33 may be configured to measure temperature, pressure (static, dynamic, acoustic), fluid resistivity, or any other parameter of interest. What is important is that the sensor 30 is implemented utilizing an intrinsic fiber optic sensor element 33, and the sensor 30 is exposed to the environmental parameter of interest. The sensor carrier element 12 of the invention is particularly useful with sensors 30 that can be multiplexed with one another such that a plurality of such sensors 30 are distributed along a length of coiled tubing 10. As described herein, sensors 30 implemented using fiber Bragg gratings may be multiplexed with one another utilizing WDM and/or TDM techniques. Such sensors may be distributed and multiplexed with one another along a length of coiled tube 10, as illustrated in FIG. 1, utilizing the sensor carrier elements 12 of the invention.

Referring again to FIG. 2, the sensor carrier 12 element has a channel 40 formed therein for receiving the sensor housing 38. A dumbbell shaped seal cap 43 is positioned at one end of the channel 40. The seal cap 43 is provided with a weld 45 on its end adjacent to the coiled tubing 10a to attach the seal cap 43 to the sensor carrier element body 48. The other end of the seal cap 43 is provided with a sealing element 51 positioned within a channel 55 formed in the seal cap 43, such that the sealing element 51 provides a high pressure seal against the passage of fluids. A central bore 55 is formed in the seal cap 43, and a small diameter tube 58, such as a stainless steel capillary tube, is received within the bore 55. A second sealing element 62, received in channel 60, also acts as a high pressure seal against the passage of fluid. The tube 58 provides a passageway for an optical fiber 65 to the sensor 30. A channel 67 is formed in the end of the seal cap 43 facing the coiled tubing 10a. The channel 67 works in combination with the void space 69 formed by the central section of the seal cap 43 to provide for fluid communication between the coiled tubing 10a and a bypass channel 72 formed in sensor carrier element 12 adjacent to the sensor 30. The bypass channel 72 is provided in each sensor carrier element 12 such that fluid can flow along the length of coiled tubing 10.

At the end of the seal cap 43 facing the sensor 33, a shelf or shoulder 74 is formed in the sensor carrier element body 48. The shelf 74 and the end of the seal cap 43 contact the sensor 30. The sensor 30 is then held within the channel 40 at its other end by a tie rod 77. The tie rod 77 is configured for threaded engagement with the channel 40 by machine threads 81. A sealing element 85 may be provided between the sensor 30 and the tie rod 77. The tie rod 77 is provided with a central bore 83 for receiving a length of small diameter tubing 78, such as stainless steel capillary tubing. A locking seal cap 84 is received over the end of the tie rod 77 and is secured thereto by a lock nut 85. A channel 89 is formed between the tie rod 77 and the locking seal cap 84. The channel 89 is in fluid communication with the bypass channel 72 to complete the fluid communication path between the lengths of coiled tubing 10a, 10b. The locking seal cap 84 may also be welded to the sensor carrier element body 48 at a weld location 92 for secure attachment therebetween.

Figure 3:
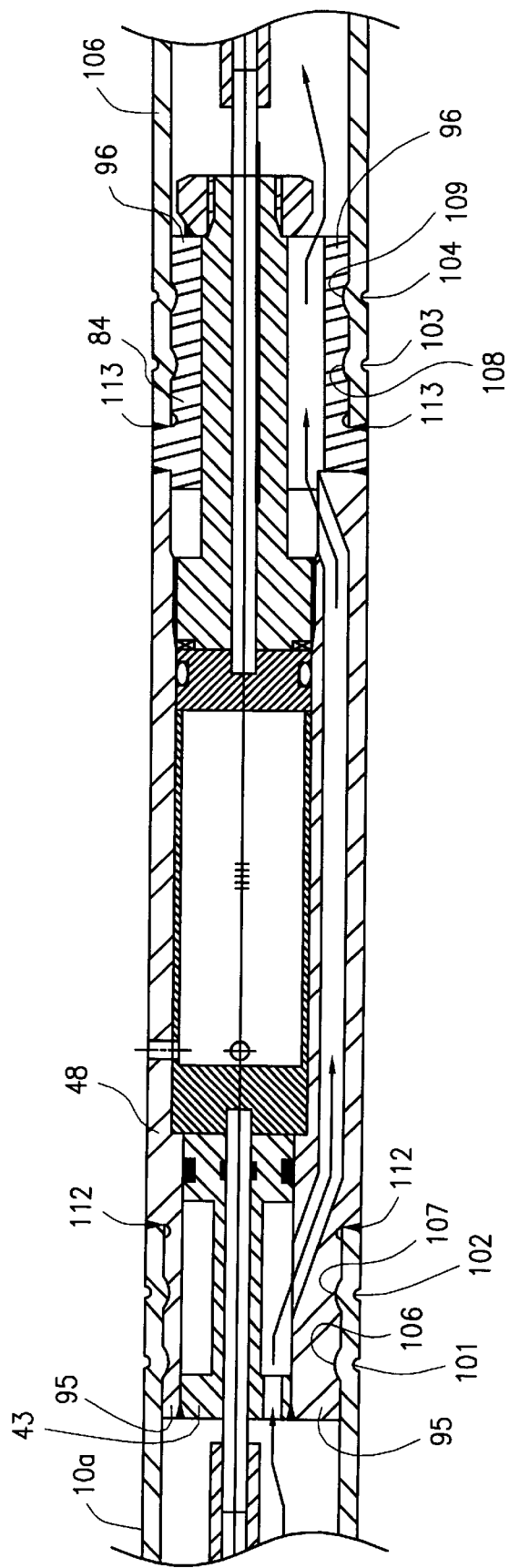
FIG. 3 is an enlarged view of the sensor carrier element of FIG. 2 showing the connecting between the sensor carrier element and the coiled tubing.

Referring to FIG. 3, the ends of the sensor carrier element 12 are provided with connection areas 95, 96 for connection to the coiled tubing 10a, 10b. The connection areas 95, 96 are reduced diameter areas having an outside diameter designed to fit snuggly into the inside diameter of the corresponding coiled tubing 10a, 10b. One connection area 95 is formed directly in the sensor carrier element housing 48 surrounding the seal cap 43. The other connection area 96 is formed in the locking seal cap 84. To provide secure engagement between the coiled tubing 10a, 10b and the connection areas 95, 96, mechanical indentations 101, 102, 103, 104 are formed in the coiled tubing 10a, 10b for engagement with indentations 106, 107, 108, 109, respectively, formed in the connection areas 95, 96. The indentations 106, 107, 108, 109 in the connection areas 95, 96 may be formed prior to engagement with the coiled tubing 10a, 10b. The mechanical indentations 101, 102, 103, 104 in the coiled tubing may be formed after the coiled tubing is joined with the connection areas 95, 96.

To provide further secure engagement between the coiled tubing 10a, 10b and the connection areas 95, 96, welds 112, 113 may be used at the interface therebetween.

Referring again to FIG. 2, small diameter tubing 120, such as stainless steel capillary tubing, is positioned within the lengths of coiled tubing 10a, 10b. The tubing 120 contains one or more lengths of optical fiber 122. The tubing 120 is provided with an excess length with respect to the coiled tubing 10. In particular, if both the tubing 120 and the coiled tubing 10 were stretched straight, the tubing 120 would be longer than the corresponding length of coiled tubing 10. Similarly, the optical fiber 122 is provided with an excess length with respect to the tubing 120.

Figure 4:
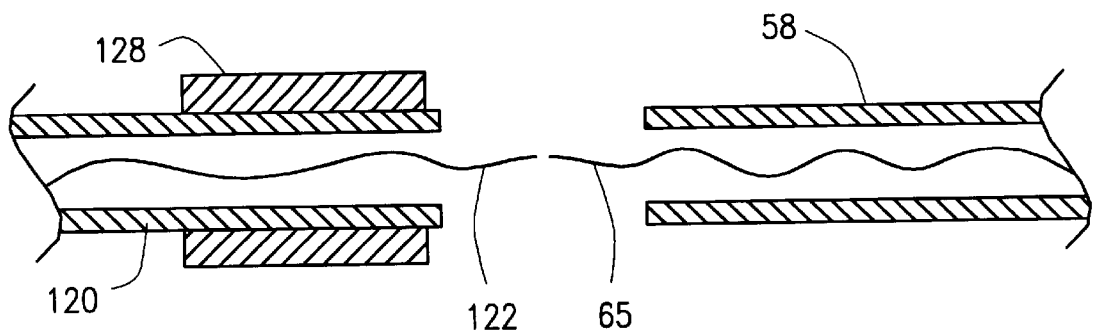
FIGS. 4–6 are cross-sectional views showing the connection between the optical fiber and small diameter tubing of the sensor carrier elements and the coiled tubing.
Figure 5:
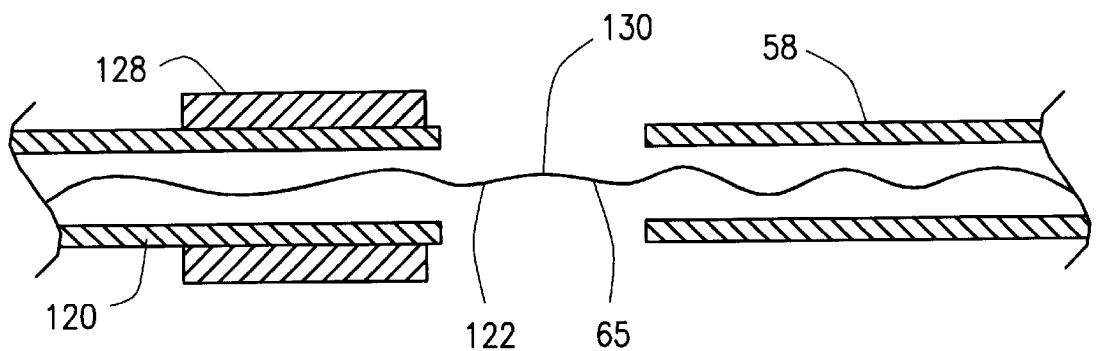
Figure 6:
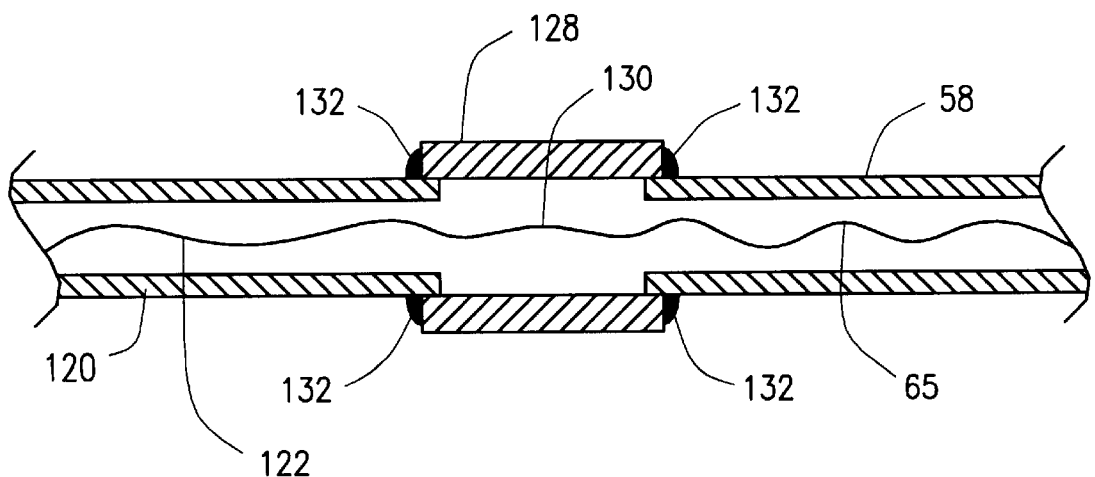

During connection between the coiled tubing 10a, 10b and the sensor 30, first a connection is made between the lengths of optical fiber and the capillary tubing. Referring to FIG. 4, a splice sleeve 128 is slide over the tubing 120 within the coiled tubing 10 (FIGS. 1 and 2). Next, as shown in FIG. 5, the optical fiber 65 of the sensor 30 is spliced to the optical fiber 122 within the tubing 120 at a splice location 130. The optical fibers 122, 65 may be spliced by any suitable method, such as fusion splicing. Referring now to FIG. 6, once the fibers 122, 65 are spliced, the tubing 120, 58 is joined together by the splice sleeve 128. The splice sleeve 128 is slide on the tubing 120 so that it covers the fiber in the splice area and extends onto the tubing 65 in the sensor 30. The splice sleeve 128 is then permanently attached at attachment locations 132 by a suitable joining or adhesive method, such as by welding, soldering, high strength adhesive, or other suitable method.

Referring again to FIG. 2, the sensor carrier element 12 may be provided with a port 138 that is in alignment with a port in the sensor housing 38 for fluid communication between the sensor 30 and the production fluid outside of the coiled tubing 10. In this case, the sensor can then be used to measure the pressure of the production fluid. Alternatively, if the sensor 30 is used as a temperature sensor, such fluid communication may not be necessary, provided that the sensor 30 and sensor carrier element 31 are manufactured of materials to accurately translate the temperature of the environment to the fiber optic sensor element 33. As will be understood by those skilled in the art, the sensor 30 and sensor carrier element 12 will be configured as necessary to expose the transduction configuration of the sensor 30 to the environment for measuring the parameters of interest.

Although the intrinsic fiber optic sensor element is illustrated in FIG. 2 as a single Bragg grating, other sensor element configurations may be used in accordance with the present invention. In particular, each intrinsic fiber optic sensor element may include a Bragg grating sensor element, such as a Bragg grating point sensor, a resonant cavity formed with multiple Bragg gratings (Fabry Perot interferometer), or a lasing element formed with multiple Bragg gratings. Each Bragg grating sensor element is configured in a desired transduction configuration such that the measurand of interest causes a strain in the Bragg grating sensor element, the magnitude of the strain being related to the measurand of interest. More particularly, each Bragg grating sensor element is responsive to an optical signal and to a strain induced by the transduction structure, the strain being associated with a respective measurand, for providing an optical sensing signal related to a magnitude of the measurand at the sensor location.

Figure 7:
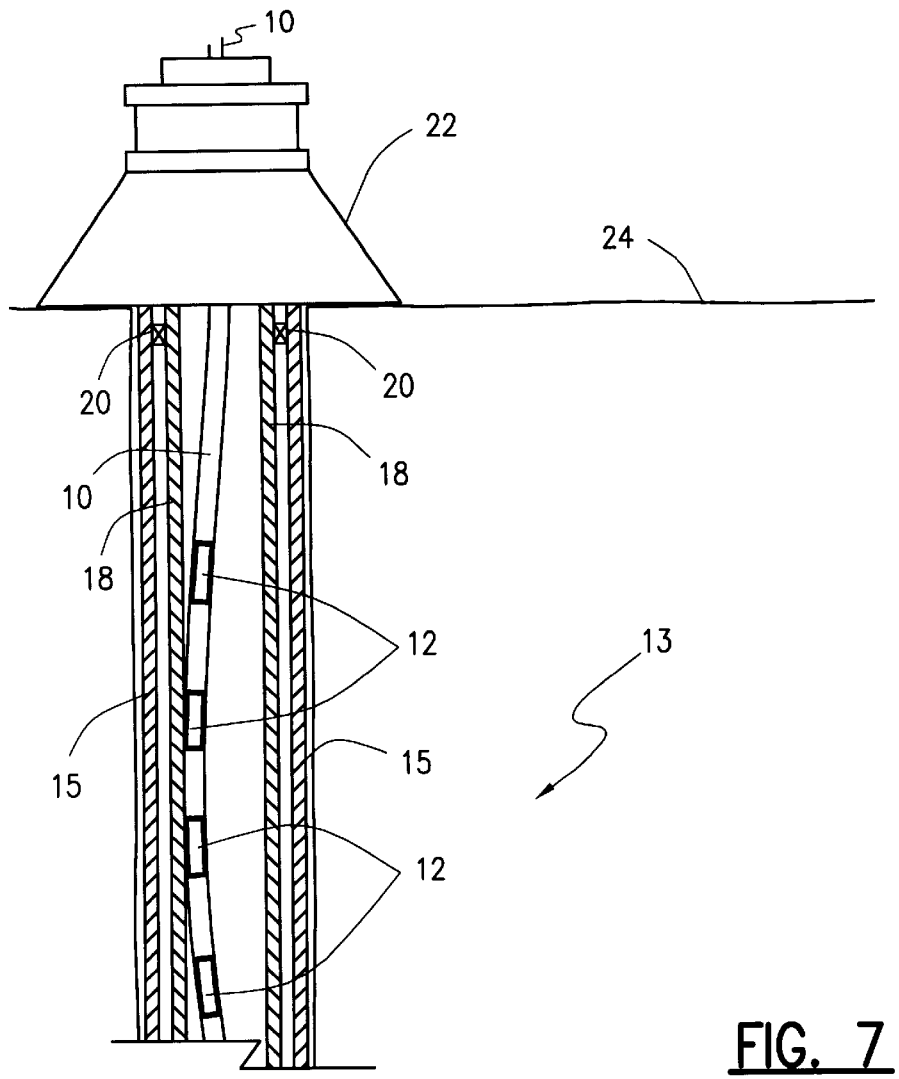
FIG. 7 is a longitudinal cross-sectional view of a wellbore having a coiled tubing with a plurality of distributed multiplexed fiber optic sensors in accordance with a second embodiment of the present invention.
Figure 7:
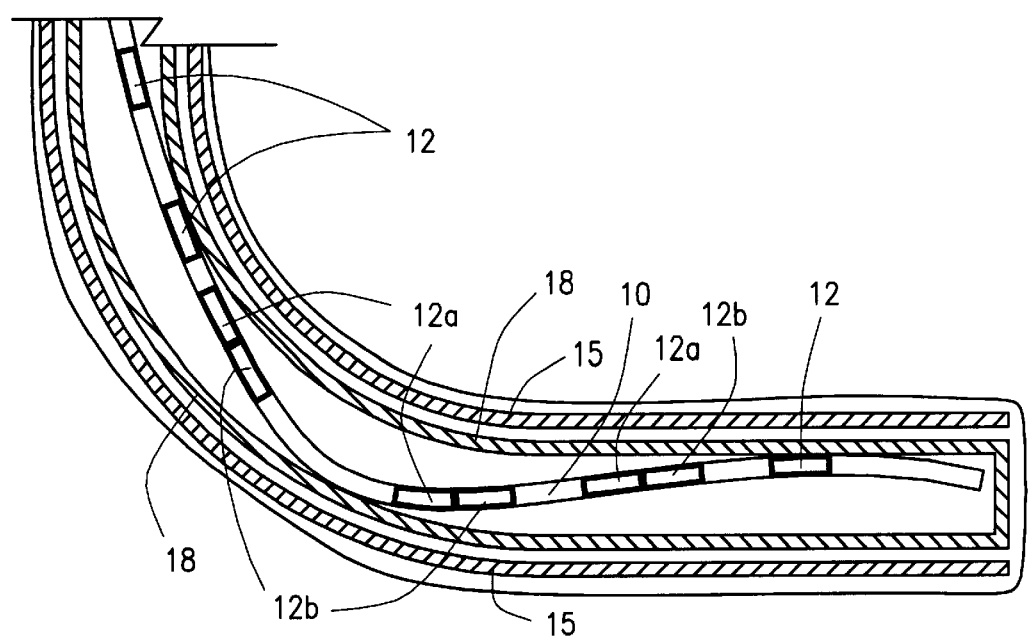

The invention is illustrated in FIG. 1 as providing a single sensor carrier element 12 between two lengths of coiled tubing 10. However, as illustrated in FIG. 7, a pair of sensor carrier element 12a, 12b may be positioned between lengths of coiled tubing 10. In this case, the sensor carrier elements 12a, 12b may be welded to one another. Alternatively, any suitable connection method may be used, such as a short length of coiled tubing therebetween. Additionally, the invention is illustrated in FIG. 1 with the length of coiled tubing terminating with a sensor 12. However, as illustrated in FIG. 7, the length of coiled tubing may terminate with a section of coiled tubing. As will be understood by those skilled in the art, the present invention provides for the delivery of distributed, multiplex fiber optic sensors utilizing coiled tubing. The sensors may be distributed as desired.

The invention may utilize a single length of optical fiber interconnecting all of the sensors, or multiple fibers may be used, with each fiber interconnected to one or more sensors.

The invention is described herein as utilizing sensors implemented with intrinsic fiber optic elements. However, the sensor carrier elements of the invention may also be used to deliver distributed electrical sensors to an environment of interest. In this case, the electrical sensors are interconnected to an electrical signal line as opposed to an optical fiber. Separate electrical conductors may be provided for each electrical sensor, or alternatively, a plurality of electrical sensors may be multiplexed on a single electrical line. Of course, a combination of electrical and optical sensors may be distributed along a length of coiled tubing using the sensor carrier elements of the invention.

Although the invention has been described and illustrated with respect to exemplary embodiments thereof, the foregoing and various other additions and omissions may be made therein and thereto without departing from the spirit and scope of the present invention.

We claim:

1. A coiled tubing sensor system, comprising:
  a plurality of lengths of coiled tubing;
  a plurality of sensor carrier elements, said plurality of sensor carrier elements being interconnected to said plurality of lengths of coiled tubing to thereby form a continuous length of coiled tubing with said plurality of sensor carrier elements in distributed positions along said continuous length of coiled tubing;
  a sensor positioned within each one of said sensor carrier elements, each sensor containing at least one fiber optic sensor element for measuring at least one parameter in an environment; and
  optical fiber positioned within said plurality of lengths of coiled tubing, said optical fiber interconnecting said fiber optic sensor elements for providing an optical signal path for optical signals to and from said fiber optic sensor elements.

2. A coiled tubing sensor system according to claim 1, wherein said optical fiber includes a single, continuous length of optical fiber interconnecting all of said fiber optic sensor elements.

3. A coiled tubing sensor system according to claim 2, wherein said fiber optic sensor elements are intrinsic fiber optic sensor elements formed in said single continuous length of optical fiber.

4. A coiled tubing sensor system according to claim 1, wherein said optical fiber includes a plurality of individual lengths of optical fiber, each one of said individual lengths of optical fiber being interconnected to one or more of said fiber optic sensor elements.

5. A coiled tubing sensor system according to claim 1, wherein said optical fiber includes a plurality of individual lengths of optical fiber interconnected along said plurality of lengths of coiled tubing to said fiber optic sensor elements to thereby form a single continuous length of optical fiber.

6. A coiled tubing sensor system according to claim 5, wherein said fiber optic sensor elements are intrinsic fiber optic sensor elements formed in said single continuous length of optical fiber.

7. A coiled tubing sensor system according to claim 1, further comprising fiber carrier means in each of said plurality of lengths of coiled tubing, said optical fiber being positioned within said fiber carrier means.

8. A coiled tubing sensor system according to claim 7, wherein said fiber carrier means is interconnected to each of said sensor carrier elements.

9. A coiled tubing sensor system according to claim 8, wherein said fiber carrier means is a plurality of lengths of capillary tubing.

10. A coiled tubing sensor system according to claim 9, wherein said capillary tubing has an excess length with respect to said coiled tubing, and wherein said optical fiber has an excess length with respect to said capillary tubing.

11. A coiled tubing sensor system according to claim 8, wherein said fiber carrier means includes a coating material surrounding the optical fiber.

12. A coiled tubing sensor system according to claim 1, further comprising transmission means in each sensor carrier element for transmission of selected environmental conditions to the sensor carried therein.

13. A coiled tubing sensor system according to claim 12, wherein said transmission means includes fluid communication means for exposing said sensor to fluid in the environment.

14. A coiled tubing sensor system according to claim 12, wherein said transmission means includes heat transmission means.

15. A coiled tubing sensor system according to claim 12, wherein said transmission means includes acoustic signal transmission means.

16. A coiled tubing sensor system according to claim 1, wherein each fiber optic sensor element includes a Bragg grating sensor element configured in a desired transduction configuration in said sensor such that a measurand of interest causes a strain in said Bragg grating sensor element, the magnitude of the strain being related to the measurand of interest.

17. A coiled tubing sensor system according to claim 1, wherein said fiber optic sensor elements in said plurality of sensors are serially connected to one another for distributed sensing of one or more parameters at multiple locations along said plurality of lengths of coiled tubing.

18. A coiled tubing sensor system according to claim 17, wherein time division multiplexing (TDM) is used to differentiate between signals from different ones of said serially connected fiber optic sensor elements.

19. A coiled tubing sensor system according to claim 17, wherein wavelength division multiplexing (WDM) is used to differentiate between signals from different ones of said serially connected fiber optic sensor elements.

20. A coiled tubing sensor system according to claim 17, wherein time division multiplexing (TDM) and wavelength division multiplexing (WDM) is used to differentiate between signals from different ones of said serially connected fiber optic sensor elements.

21. A coiled tubing sensor system according to claim 1, wherein each sensor carrier element includes at least one connection area for connection to one of said plurality of lengths of coiled tubing, said connection area having an outside diameter slightly less than the inside diameter of the coiled tubing such that the connecting area is received in the coiled tubing to provide a connection therebetween, said sensor carrier elements being configured to maintain the structural integrity of the coiled tubing.

22. A coiled tubing sensor system according to claim 1, wherein each sensor carrier element includes fluid bypass means for providing a fluid communication path between two lengths of said plurality of lengths of coiled tubing interconnected by a sensor carrier element.

23. A coiled tubing sensor system, comprising:

a plurality of lengths of coiled tubing;

a plurality of sensor carrier elements, said plurality of sensor carrier elements being interconnected to said plurality of lengths of coiled tubing to thereby form a continuous length of coiled tubing with said plurality of sensor carrier elements in distributed positions along said continuous length of coiled tubing;

a sensor positioned within each one of said sensor carrier elements, each sensor containing sensing means for measuring at least one parameter in an environment; and signal transmission means positioned within said plurality of lengths of coiled tubing, said signal transmission means interconnecting said sensing means for providing a signal path for signals to and from said sensing means.

24. A coiled tubing sensor system according to claim 23, wherein said sensing means includes a plurality of electrical sensors and wherein said signal transmission means is an electrical signal conductor.

25. A coiled tubing sensor system according claim 24, wherein said sensing means further includes a plurality of fiber optic sensing elements and wherein said signal transmission means further includes an optical fiber.

26. A coiled tubing sensor system according to claim 23, further comprising carrier means for said signal transmission means, said carrier means being positioned in each of said plurality of lengths of coiled tubing, said signal transmission means being positioned within said carrier means.

27. A coiled tubing sensor system according to claim 26, wherein said carrier means is interconnected to each of said sensor carrier elements.

28. A coiled tubing sensor system according to claim 27, wherein said carrier means is a plurality of lengths of capillary tubing.

29. A coiled tubing sensor system according to claim 28, wherein said capillary tubing has an excess length with respect to said coiled tubing, and wherein said signal transmission means has an excess length with respect to said capillary tubing.

30. A coiled tubing sensor system according to claim 23, further comprising transmission means in each sensor carrier element for transmission of selected environmental conditions to the sensor carried therein.

31. A coiled tubing sensor system according to claim 30, wherein said transmission means includes fluid communication means for exposing said sensor to fluid in the environment.

32. A coiled tubing sensor system according to claim 30, wherein said transmission means includes heat transmission means.

33. A coiled tubing sensor system according to claim 30, wherein said transmission means includes acoustic signal transmission means.

34. A coiled tubing sensor system according to claim 23, wherein each sensor carrier element includes at least one connection area for connection to one of said plurality of lengths of coiled tubing, said connection area having an outside diameter slightly less than the inside diameter of the coiled tubing such that the connecting area is received in the coiled tubing to provide a connection therebetween, said sensor carrier elements being configured to maintain the structural integrity of the coiled tubing.

35. A coiled tubing sensor system according to claim 23, wherein each sensor carrier element includes fluid bypass means for providing a fluid communication path between two lengths of said plurality of lengths of coiled tubing interconnected by a sensor carrier element.

* * * * *